United States Patent
Baugh

(10) Patent No.: US 10,619,763 B2
(45) Date of Patent: Apr. 14, 2020

(54) SUBSEA PIPELINE CONNECTOR METHOD

(71) Applicant: Benton Frederick Baugh, Houston, TX (US)

(72) Inventor: Benton Frederick Baugh, Houston, TX (US)

(*) Notice: Subject to any disclaimer, the term of this patent is extended or adjusted under 35 U.S.C. 154(b) by 187 days.

(21) Appl. No.: 15/889,565

(22) Filed: Feb. 6, 2018

(65) Prior Publication Data
US 2019/0242497 A1 Aug. 8, 2019

(51) Int. Cl.
| | |
|---|---|
| *F16L 1/26* | (2006.01) |
| *F16L 13/10* | (2006.01) |
| *G01M 3/28* | (2006.01) |
| *F16L 17/10* | (2006.01) |
| *F16L 13/11* | (2006.01) |
| *F16L 21/08* | (2006.01) |
| *F16L 1/18* | (2006.01) |
| *F16L 25/06* | (2006.01) |

(52) U.S. Cl.
CPC .................... *F16L 1/26* (2013.01); *F16L 1/18* (2013.01); *F16L 13/103* (2013.01); *F16L 13/116* (2013.01); *F16L 17/10* (2013.01); *F16L 21/08* (2013.01); *G01M 3/2815* (2013.01); *F16L 25/065* (2013.01)

(58) Field of Classification Search
CPC ................ F16L 17/10; F16L 17/25
USPC ............................. 285/100–103
See application file for complete search history.

(56) References Cited

U.S. PATENT DOCUMENTS

| | | | | | |
|---|---|---|---|---|---|
| 393,684 | A | * | 11/1888 | Berryhill | F16L 17/10 277/605 |
| 1,898,623 | A | * | 2/1933 | Gammeter | F16L 17/10 285/96 |
| 2,789,843 | A | * | 4/1957 | Bily | F16L 27/0832 285/276 |
| 2,906,548 | A | * | 9/1959 | Faccou | F16L 27/0828 285/14 |
| 2,962,096 | A | * | 11/1960 | Knox | E21B 33/038 285/27 |
| 3,036,846 | A | * | 5/1962 | Peras | F16D 25/00 277/558 |
| 3,097,866 | A | * | 7/1963 | Iversen | F16L 33/16 285/18 |
| 3,420,554 | A | * | 1/1969 | Straub | B21D 39/04 285/97 |
| 3,600,010 | A | * | 8/1971 | Downs, III | F16L 17/10 285/96 |
| 3,713,204 | A | * | 1/1973 | Arnold | F16L 21/007 29/460 |
| 3,843,167 | A | * | 10/1974 | Gronstedt | F16L 17/10 285/18 |
| 5,170,659 | A | * | 12/1992 | Kemp | F16L 23/167 137/312 |
| 6,293,732 | B1 | | 1/2001 | Baugh | |
| 6,213,686 | B1 | | 4/2001 | Baugh | |

(Continued)

*Primary Examiner* — Jason L Vaughan

(57) ABSTRACT

The method of providing a connector suited for quickly connecting and testing joints of pipe for a subsea pipeline and similar applications by concurrently locking, preloading, sealing and testing of the connection to eliminate the usual sequential time requirements for each of these operations. Additionally, time for coating and X-Ray inspection of the welded connection in critical path time are eliminated as the welding and coating operations are able to be done on shore in non-critical path time.

18 Claims, 5 Drawing Sheets

(56) References Cited

U.S. PATENT DOCUMENTS

| | | |
|---|---|---|
| 6,334,739 B1 | 1/2002 | Baugh |
| 6,364,573 B1 | 3/2002 | Baugh |
| 6,776,560 B2 | 8/2004 | Moszkowski |
| 6,910,848 B1 | 6/2005 | Baugh |
| 7,118,137 B2 * | 10/2006 | Deremiah .............. F16L 21/035 285/93 |
| 7,731,240 B2 * | 6/2010 | Barker ................... F16L 37/62 285/106 |
| 9,217,526 B2 * | 12/2015 | Eccleston ............... F16L 11/12 |

\* cited by examiner

SUBSEA PIPELINE CONNECTOR METHOD

TECHNICAL FIELD

This invention relates to a method of providing a connector suited for quickly connecting and testing joints of pipe for a subsea pipeline and similar applications while eliminating the need for welding, X-ray, and coating operations.

BACKGROUND OF THE INVENTION

Offshore pipelines laid along the seafloor for the delivery of oil and gas from a source to an ultimate destination are manufactured of short joints of pipe as a manufacturing reality. These joints of pipe must be connected together in order to make a pipeline. The cost it takes to make the connection is a factor of the cost of the connection, the time it takes to make the connection, and the time it takes to do any required coating after the connection is made. A major portion of the costs was simply the vessel time charge to make the connections.

Historically the connections have been made by welding the joints of the pipe together on a barge. The efficiency of this process was improved by providing multiple stations spaced along a horizontal deck so that several workers could be making a portion of the welds at the same time. An added station for coating made this a concurrent time also. These barges are referred to as "S" lay as the pipe comes off horizontally, bends downwardly towards the seafloor across a stinger, and then reverse bends onto the seafloor, resembling an "S".

More recently a J-Lay method has been used which uses and inclined tower so that the pipe departs the vessel in line with the tower and makes a single bend onto the ocean floor.

More recently yet, long sections of pipe have been welded together at lower cost on shore, and then simply reeled together onto a reel barge. To envision this, you need to imagine a twenty-four-inch diameter pipe being rolled up on a very large spool like a hose. The speed of simply unrolling the pipe offshore made this a very fast operation, which easily overcame the higher vessel cost. This is especially true in longer pipelines where the connection time accumulates. A problem with this method is that in some cases the pipelines tend to be buoyant and need to be weighed down. The typical weight is a layer of concrete, which will not bend.

Shorter and infield pipelines typically do not justify the high mobilization costs and daily rate of a reel type barge method. They are more economic with the balance of higher joint connection costs but lower vessel and mobilization costing. As a comparison, the mobilization cost of a modern reel pipelay vessel to a remote location can exceed the capital cost of a simpler jointed laying system placed on a local barge.

On the jointed laying systems, a connection has to be made, it typically has to be inspected, it has to be pressure tested, and the connection has to be coated. In a lower cost J-Lay type systems, each of these events must happen in sequence, so connection time can be a majority of the cost of the pipe laying other than the pipe itself.

Some solutions have been proposed to speed the connection and handling operations from forging to welding specially prepared connectors on each end of the joint of pipeline for quick make-up. The have characteristically required a specialty connector half to be welded to both ends of the pipe sections in preparation for the fast make-up.

Since the inception of pipelaying of any kind, and especially since the inception of J-Lay style pipeline laying, a need for a low-cost connector which will rigidly and assuredly connect the joints of pipeline together without a specially prepared end to be mated with has been needed. Additional needs have been connectors with rapid testing and elimination of X-Ray or ultrasonic inspections at the connection site on the rig for quality assurance.

BRIEF SUMMARY OF THE INVENTION

The object of this invention is to provide a connector which will quickly connect the end of two sections of pipeline.

A second object of this invention is to provide a connector which eliminates the time for welding.

A third objective of this invention is to provide a connector which eliminates extra time for pressure testing Another objective of this invention is to provide a connector which eliminates extra time for X-Ray or ultrasonic testing.

Another objective of this invention is to provide a connector which is a fully preloaded connector.

Another objective of this invention is to provide a connector which is combines the pressure force within said connector with the tension in the connector to preload the connector.

Another objective of this invention is to provide a connector which eliminates the need for a specially prepared second end for the mating connection.

Another objective of this invention is to provide a connector which will concurrently lock, preload, seal, and test the connection.

Another objective of this invention is to provide a connector which will use the actuating pressure within said connector to pressure test said connector against a higher pressure within said sections of pipe than outside said sections of pipe and a higher pressure outside said sections of pipe than inside said sections of pipe.

DETAILED DESCRIPTION OF THE INVENTION

Figure 1:
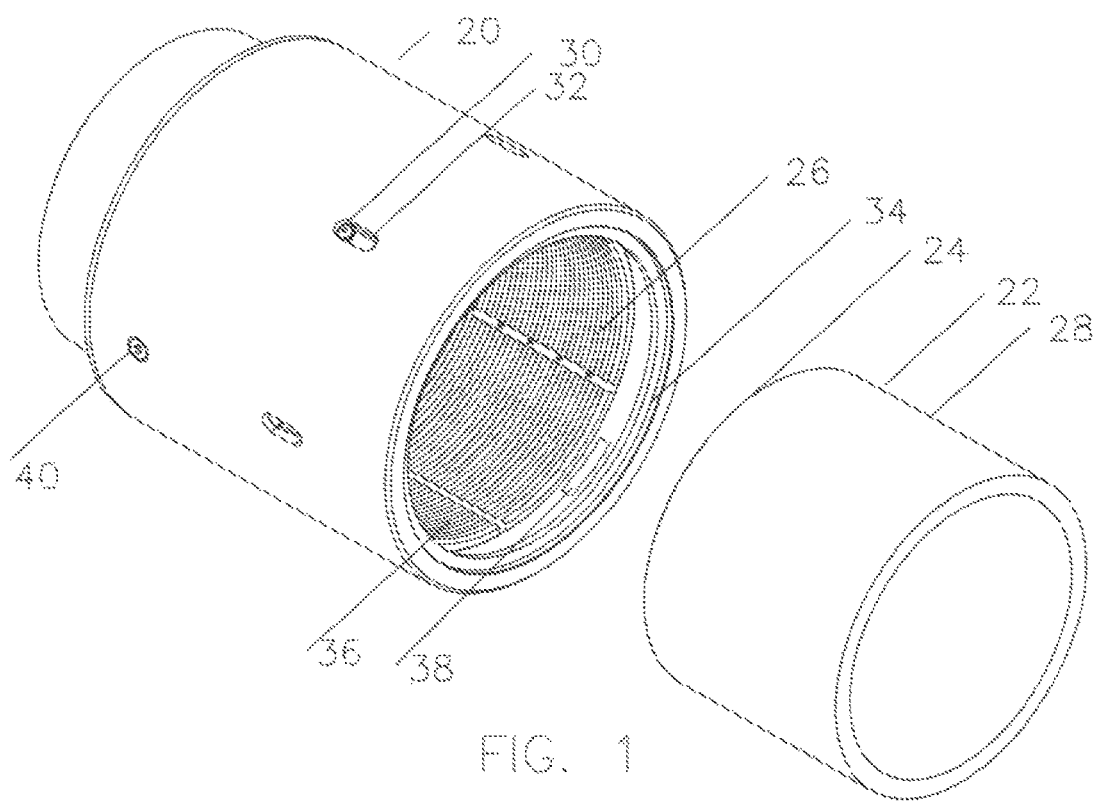
FIG. 1 is a perspective of a connector and a plain end of pipe ready to be engaged.

Referring now to FIG. 1, a perspective of a connector 20 and a plain end of pipe 22 are shown ready to be engaged. The plain end of pipe 22 will have a buttweld preparation 24 in anticipation of the normal connection process of welding. The connector 20 shows slip segments 26 are configured to engage the outer diameter 28 of plain end pipe 22. Slip segments 26 are retained in place by bolts 30 which slide along slots 32, as will be discussed later. Environmental seal 34 is shown ready to engage the outer diameter 28 of plain end pipe 22. As connector 20 allows plain end of pipe 22 to be fully coated prior to connection, and sharp teeth 36 of slip segments 26 will cut into the coatings to firmly engage the steel pipe, it means gaps will be introduced into the coating. The environmental seal 34 prevents continued galvanic corrosion of the pipeline at the gaps in the coating. Additionally, anodic material 38 can be placed in the area to further protect the pipeline from galvanic corrosion. Fill port 40 is shown, as will be discussed later.

Figure 2:
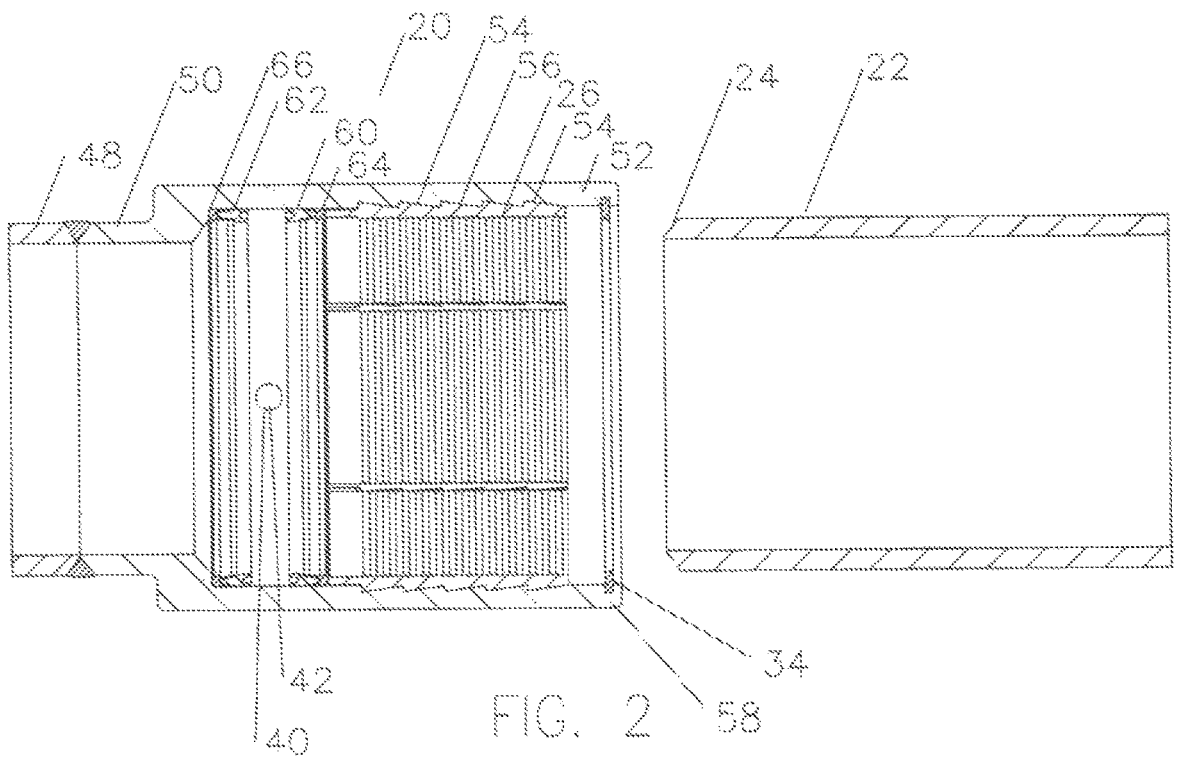
FIG. 2 is half sections of a connector and plain end of pipe from FIG. 1 ready to be engaged.

Referring now to FIG. 2, half sections of connector 20 and plain end of pipe 22 are shown, again ready to be engaged. Plain end of pipe 48 is shown to be adjacent to a buttweld 50 on connector 20 and is welded together. Plain end of pipe 22 and plain end of pipe 48 are simply the opposite ends of similar joints of pipe used in the pipeline. Body 52 of connector 20 has tapered shoulders 54 likely at an angle of eight degrees which engage similarly tapering shoulders 56 on slip segments 26. Body 52 has a groove 58 for retaining environmental seat 34 and a port 40 for retaining fill plug 42. Resilient seals 60 and 62 are provided as well as metal cap seals 64 and 66.

Figure 3:
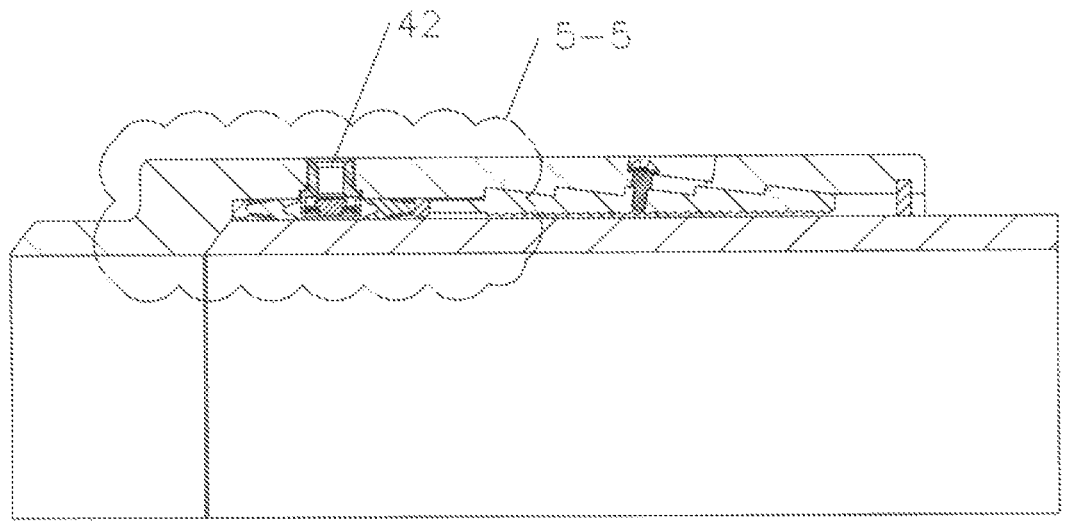
FIG. 3 is a quarter section similar to the upper half of FIG. 2 with the plain end of pipe inserted into connector.

Referring now to FIG. 3, a quarter section similar to the upper half of FIG. 2 is shown, with the plain end of pipe 22 inserted into connector 20. Fill plug 42 is shown to be opened as would happen at the start of the filling, but no other changes have been made.

Figure 4:
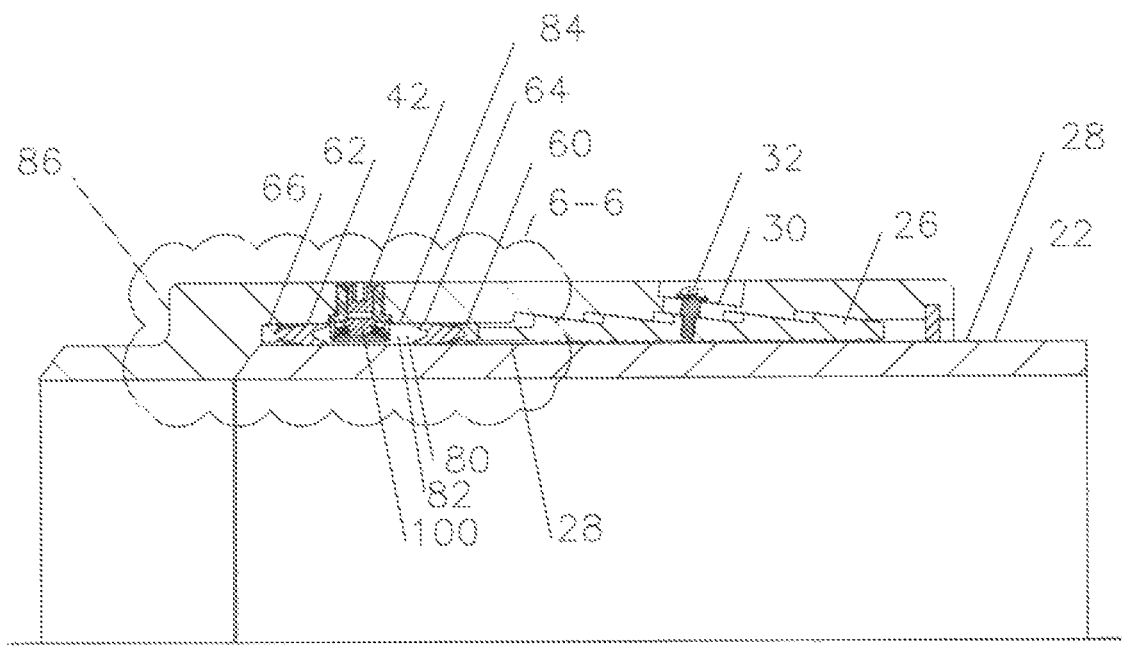
FIG. 4 is a quarter section similar to the upper half of FIG. 2 with the plain end of pipe inserted into connector with the seals and slips energized.

Referring now to FIG. 4, a quarter section similar to the upper half of FIG. 2 is shown, with the plain end of pipe 22 inserted into connector 20. Cavity 80 has been filled with a fluid or semisolid 82 such as Sealweld 5050™, resilient seals 60 and 62 have been pushed back (away from fill plug 42), metal cap seals 64 and 66 have been spread apart into intimate contact with the inner bore 84 of body 52 and the outer diameter 26 of pipeline 22. Fill plug 42 is shown to be closed and sealing as would happen at the end of the filling. Slip segments 26 have been pushed to the right down the tapered shoulders 54 such that sharp teeth 36 are biting into the outer diameter 28 of end of pipe 22.

The pressure area between the inner bore 84 of body 52 and the outer diameter 28 of pipeline 22 multiplied by the pressure of the fluid or semisolid 82 causes the slip segments 26 to be driven into preloaded contact with the plain end pipe 22.

A likely method of operation is that the already connected pipeline going towards the ocean floor will be suspended at the ocean's surface on shoulder 86 sitting on a mating shoulder (not shown). To lower the pipeline and continue the operations, the weight of the hanging pipeline must be picked up by the plain end pipe 22 such that the mating shoulder can be moved out of the way. If the pressure source filling the cavity 80 is left pressurized when the plain end pipe 22 picks up the entire weight of the hanging pipeline, the weight of the pipe will be added to the preload caused by the pressure in the pressure area, giving a greater preload for better connection tightness when installed on the ocean floor.

Figure 5:
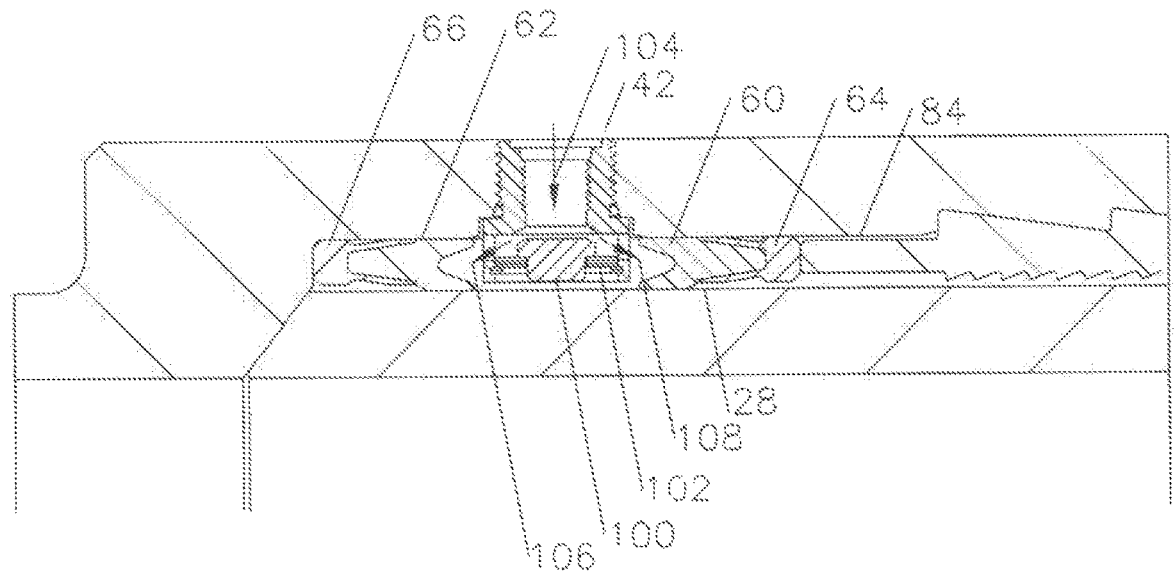
FIG. 5 is an enlarged view of the seal area as seen in cloud 5-5 of FIG. 3 showing the filler valve in the opened position.

Referring now to FIG. 5, an enlarged view of the seal area as seen in cloud 5-5 of FIG. 3 shows that when the plain end of pipe 22 is inserted, resilient seals 60 and 62 are sealing against surfaces 28 and 84 and metal cap seals 64 and 66 are not in contact. This is expected in order to be able to insert plain end of pipe into the metal seals as well as recognizing that the outer diameter 28 of end of pipe 22 is not toleranced tightly enough for typical metal seal. Fill plug 42 is shown as it would be at the start of the filling with the check 100 pushed down against springs 102 and fluid or semisolid is beginning to flow along arrows 104, 106, and 108.

Figure 6:
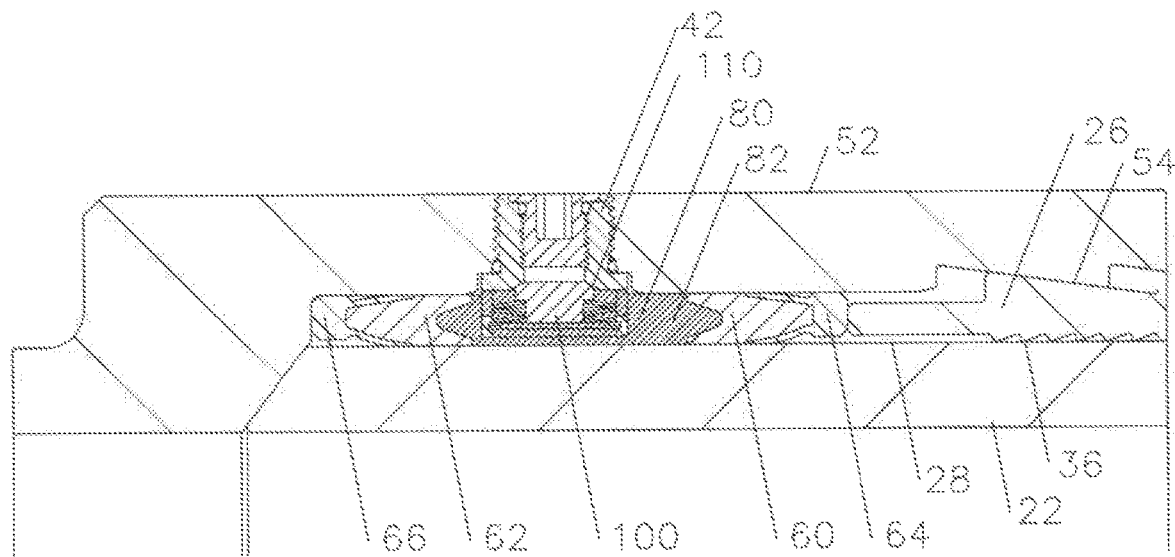
FIG. 6 is an enlarged view of the seal area as seen in cloud 6-6 of FIG. 4 showing the seal set, the slips set, the filler valve check closed and sealing, and a backup plug installed.

Referring now to FIG. 6, an enlarged view of the seal area as seen in cloud 6-6 of FIG. 4 shows that cavity 80 has been filled with a fluid or semisolid 82, resilient seals 60 and 62 remain in sealing contact and have been pushed back (away from the fill plug 42), metal cap seals 64 and 66 have been spread apart into intimate contact with the inner bore 84 of body 52 and the outer diameter 28 of pipeline 22. Fill plug 42 is shown to be closed and sealing in metal to metal contact as would happen at the end of the filling. Additionally, slip segments 26 have been pushed to the right down the tapered shoulders 54 such that sharp teeth 36 are biting into the outer diameter 28 of end of pipe 22.

As the check 100 engages seat 110 of check 42 into metal to metal contact, the pressure of the fluid or semisolid 82 is held against the resilient seals 60 and 62, and therefore the metal cap seals 64 and 66, and against the slip segments 26. Each of the seals retaining the pressure in the fluid or semisolid 82 is not only metal to metal, but is pressure energized into better contact. The resilient seals 60 and 62 remain in contact as backup seals. Each of these seals provide for zero gap sealing and the fluid or semisolid recommended has been tested to seal across gaps as much as 0.030 inches. This literally makes the fluid or semisolid a backup seal to the resilient and metal to metal seals.

In accomplishing this operation, the locking, preloading, sealing and testing of the connection has happened concurrently. Sequential time requirements for these operations has been eliminated. Additionally, time for coating and X-Ray inspection of the welded connection in critical path time has been eliminated and the welding operation was able to be done on shore in non-critical path time.

As the pressure of the energizing fluid or semisolid if between the seals, it means it is sealing both ways, as if a higher pressure is coming from the bore towards the area outside the pipe towards on resilient/metal seal combination and from outside the pipe towards the bore on the other resilient/metal seal combination. It provides a test pressure to pressure test said connector against a higher pressure within said sections of pipe than outside said sections of pipe and a higher pressure outside said sections of pipe than inside said sections of pipe at the same time, concurrently with the setting operation. This is the situation of subsea pipelines where the higher pressure may be outside the bore at one time, and at another time a vacuum may be in the bore.

Figure 7:
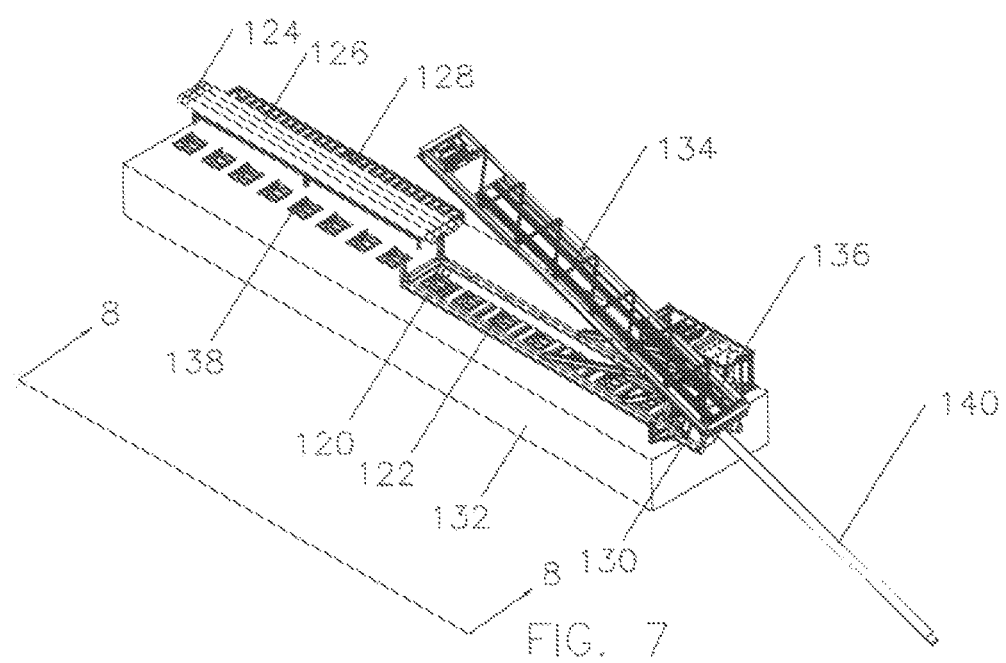
FIG. 7 a perspective view of a vessel and pipe lay tower which might use the connection of the present invention.

Referring now to FIG. 7, a perspective view of a vessel and pipe lay tower which might use a connection like the present invention. Connectors are shown at 120 on a joint of new pipe 122 about to be inserted, at 124 on the new pipe joints 126 on the ready rack 128, and one would be at what is called the stationary table 130 (not seen). The barge 132 is supporting a J-Lay type tower 134, power skid 136 and several roller stands 138. Pipeline 140 is entering the water and is being laid along the ocean floor. Pipeline 140 is constructed from multiple joints of new pipe such as those shown at 126.

Figure 8:
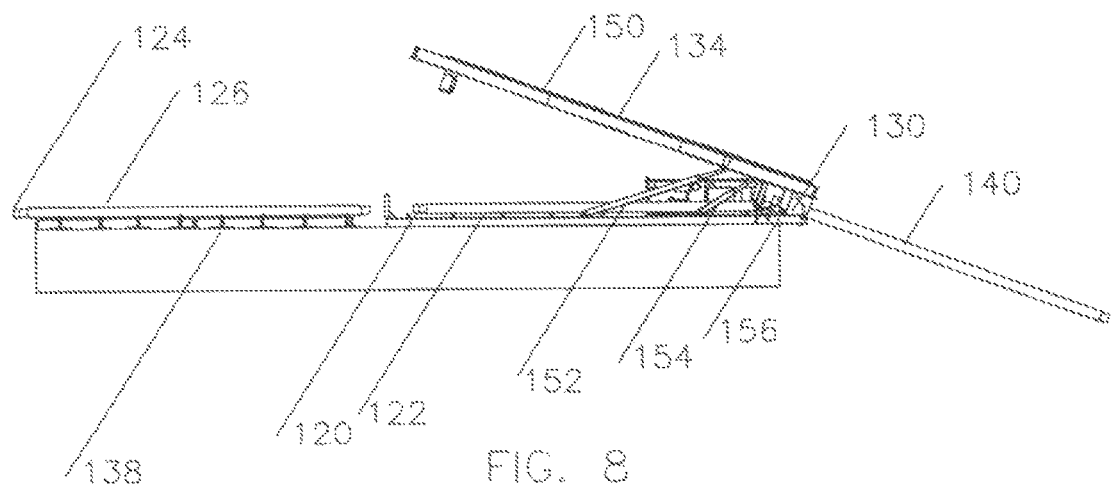
FIG. 8 is a side view taken along lines "8-8" of FIG. 7, with all the components in the same arrangement as in FIG. 7.

Referring now to FIG. 8 is a side view taken along lines "8-8" of FIG. 7, with all the components in the same arrangement as in FIG. 7. Joint of new pipe 122 has been rolled from ready rack 128 to the roller stands 138, and along the roller stands 138 to the present position below the mast 150 of J-Lay tower 134. Cylinders 152 and 154 will tilt the mast 150 about pivot point 156.

Figure 9:
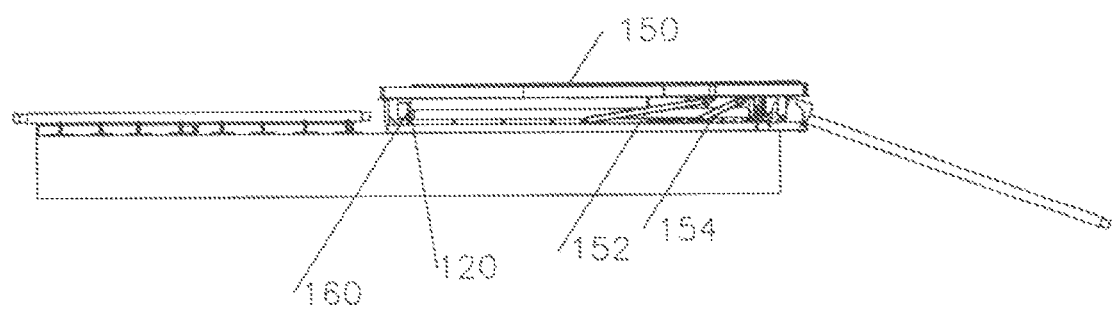
FIG. 9 shows the mast cylinders having laid the mast down such that traveling head can engage connector on a new joint of pipe to be added to the pipeline which is already in the ocean water.

Referring now to FIG. 9, cylinders 152 and 154 have laid mast 150 down such that traveling head 160 can engage connector 120. Travelling head 160 can be of an internal or external grip type depending upon the method chosen to grip the pipe. With the connector of the present invention run at the upper end of the pipe sections, the gripping style will most likely be an internal connector.

Figure 10:
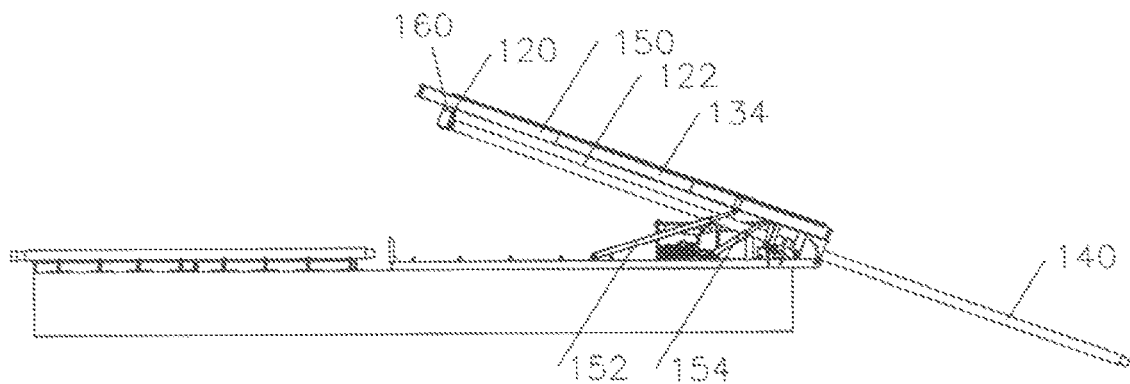
FIG. 10 shows that the cylinders have raised mast such that new joint of pipe is in alignment with pipeline in the ocean and the connection is ready to be made.

Referring now to FIG. 10, cylinders 152 and 154 have raised mast 150 such that new pipe 122 is in alignment with pipeline 140 and the connection is ready to be made.

Figure 11:
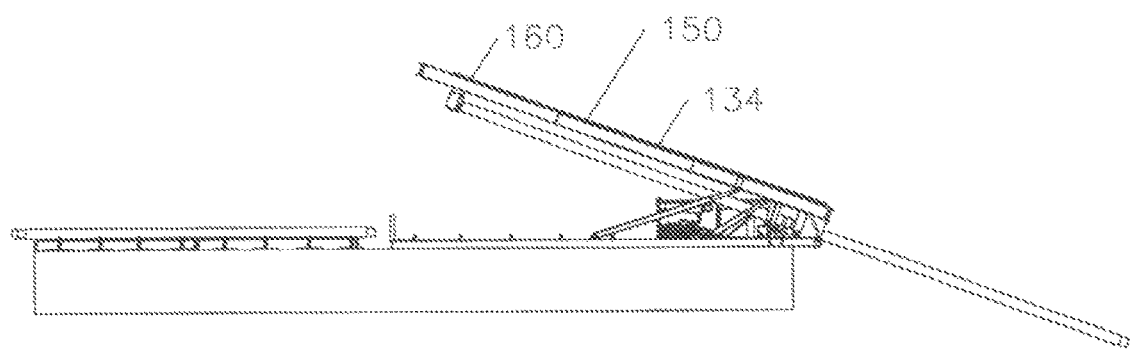
FIG. 11 shows traveling head has traveled down the mast until the with the plain end of pipe is inserted into connector as is seen in FIGS. 3 and 5.

Referring now to FIG. 11, traveling head 160 has traveled down the mast 150 until the with the plain end of pipe 22 inserted into connector 20 as is seen in FIGS. 3 and 5. At this time the connection is ready to be set as is indicated in FIGS. 4 and 6. After the connection is made, traveling head 160 will move back up mast 150 slightly to allow the connection to be freed from the mating shoulder as discussed with FIG. 4.

Figure 12:
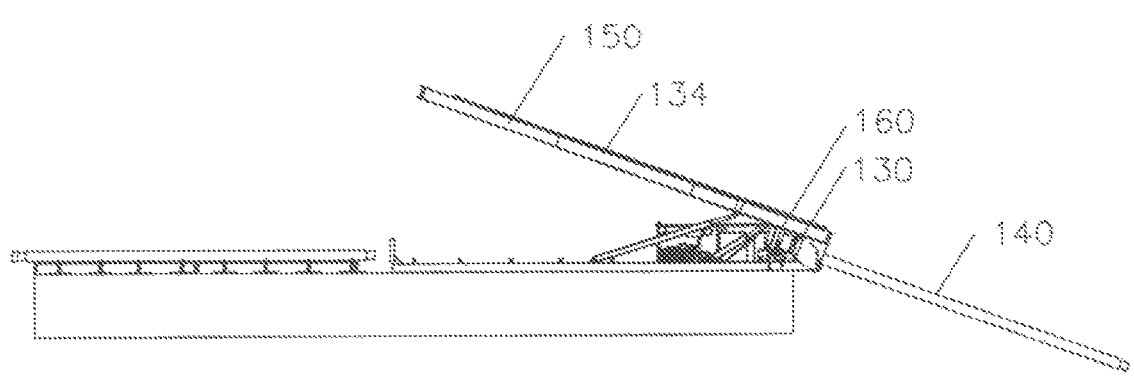
FIG. 12 shows traveling head moved down the mast until the connector is landed on the stationary table mating shoulder.

Referring now to FIG. 12, traveling head 160 moves down the mast 150 until the connector 120 is landed in the stationary table 130 mating shoulder as discussed with FIG. 4. Travelling head 160 will then release from the pipeline 140 and travel back up mast 150 to the position as shown in FIG. 8 to repeat the process.

The application of the connector as discussed in the prior figures has focused on the connection of subsea pipelines which are laying along the seafloor between subsea installations. The connector will also prove useful in other applications such as vertical risers and short connecting spools to connect the end of flowlines to subsea Christmas trees.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

That which is claimed is:

1. A method of connecting two sections of pipe comprising providing a connector on one end of a first section of pipe, inserting the end of a second section of pipe into said connector, providing two or more resilient seals within said connector which sealingly engage an internal bore of said connector and an outer diameter said end of said second section of pipe, the area between said inner bore of said connector and said outer diameter of said second section of pipe forming a piston area, injecting a fluid or semi-fluid sealant between said two or more resilient seals causing a pressure between said two or more resilient seals resulting in a pressure force on said piston area, causing said pressure force on said piston area to move a set of slips down a taper in said connector and into engagement with said outer diameter of said second section of pipe, and wherein said pressure force on said piston area is an actuating pressure that causes said slips to connect the two pipe sections and pressure test the connector.

2. The method of claim 1 further comprising sealant comprises solid particles to enhance its sealing capability.

3. The method of claim 1 further comprising providing two or more metal seals which do not engage said outer diameter of said second section of pipe upon insertion of said second section of pipe into said connector but are urged into engagement with said outer diameter of said second section of pipe when said pressure is introduced between said two or more resilient seals.

4. The method of claim 1 further comprising injecting said fluid or semi-fluid sealant between said two or more resilient seals through a check valve which closes when said injection is completed thereby retaining at least a portion of said pressure between said two or more resilient seals.

5. The method of claim 1 further comprising adding an environmental seal between said connector and said outer diameter of said second section of pipe to prevent cathodic erosion of said second section of pipe.

6. The method of claim 1 further comprising combining said pressure force with tension load from said second pipe section to preload said connector.

7. The method of claim 1 further comprising using the actuating pressure within said connector to pressure test said connector against a higher pressure within said sections of pipe than outside said sections of pipe and a higher pressure outside said sections of pipe than inside said sections of pipe.

8. The method of claim 1 further comprising injecting said fluid or semi-fluid sealant between said two or more resilient seals concurrently locks, preloads, seals, and tests said connector to said second section of pipe.

9. A method of connecting two sections of pipe comprising providing a first pipe including an enlarged end portion that is a connector, inserting the end of a second section of pipe into said connector, and concurrently locking said connector to said end of said second section of pipe, preloading said connector to said end of said second section of pipe, sealing said connector to said end of said second section of pipe, testing said connector to said end of said second section of pipe, and
  wherein the sealing of the connector includes forming an actuating pressure which concurrently seals and pressure tests the connector.

10. The method of claim 9 further comprising providing two or more resilient seals within said connector which sealingly engage an internal bore of said connector and an outer diameter of said end of said second section of pipe, the area between said inner bore of said connector and said outer diameter of said second section of pipe forming a piston area.

11. The method of claim 10 wherein said actuating pressure is formed by injecting a fluid or semi-fluid sealant between said two or more resilient seals causing a pressure between said two or more resilient seals resulting in a pressure force on said piston area, and causing said pressure force on said piston area to move a set of slips down a taper in said connector and into engagement with said outer diameter of said second section of pipe.

12. The method of claim 11 wherein the fluid or semi-fluid sealant includes solid particles to enhance its sealing capability.

13. The method of claim 11 further comprising providing two or more metal seals which do not engage said outer diameter of said second section of pipe upon insertion of said second section of pipe into said connector but are urged into engagement with said outer diameter of said second section of pipe when said pressure is introduced between said two or more resilient seals.

14. The method of claim 11 wherein said fluid or semi-fluid sealant is injected between said two or more resilient seals through a check valve which closes when said injection is completed thereby retaining at least a portion of said pressure between said two or more resilient seals.

15. The method of claim 11 further comprising combining said pressure force with the tension load with said second pipe section to preload said connector.

16. The method of claim 9 further comprising adding an environmental seal between said connector and said outer diameter of said second section of pipe to prevent cathodic erosion of said second section of pipe.

17. The method of claim 9 further comprising coating said end of said second section of pipe.

18. The method of claim 9 further comprising using the actuating pressure within said connector to pressure test said connector against a higher pressure within said sections of pipe than outside said sections of pipe and a higher pressure outside said sections of pipe than inside said sections of pipe.

* * * * *